Aug. 15, 1944.  R. S. TAYLOR  2,355,828
COMBINED COOLING AND DEHUMIDIFYING SYSTEM
Filed Feb. 25, 1943
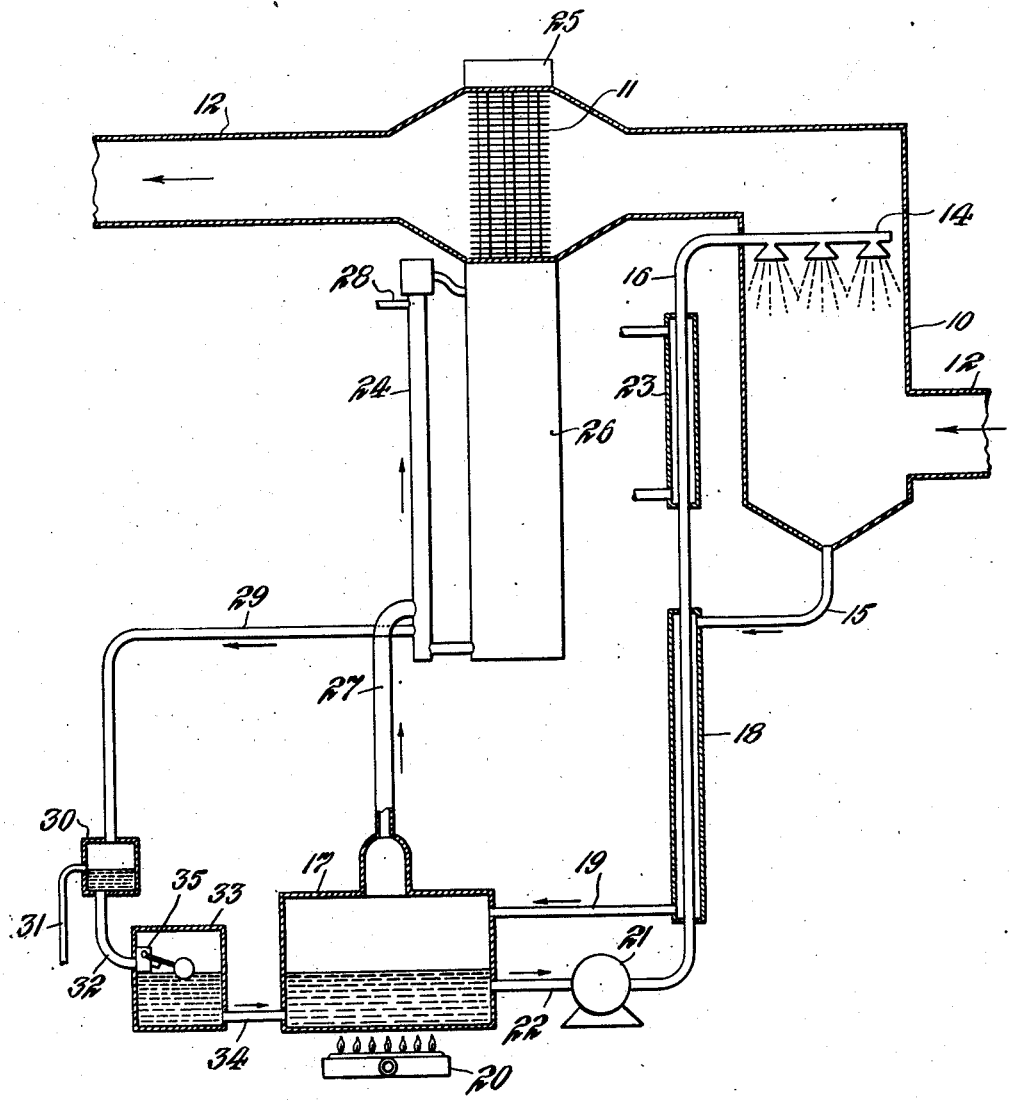
INVENTOR
Robert S. Taylor
BY
ATTORNEY Patented Aug. 15, 1944

2,355,828

UNITED STATES PATENT OFFICE 2,355,828

COMBINED COOLING AND DEHUMIDIFYING SYSTEM

Robert S. Taylor, Evansville, Ind., assignor to Servel, Inc., New York, N. Y., a corporation of Delaware Application February 25, 1943, Serial No. 477,024

6 Claims. (Cl. 62—129)

My invention relates to cooling and dehumidifying of gases.

After a dehumidifying agent has been brought into contact with a gas, such as air, to effect removal of water vapor, the dehumidifying agent usually is reactivated and again brought into contact with the gas to remove water vapor therefrom. The reactivating circuit for the dehumidifying agent may include a boiler in which the agent is heated to expel water vapor therefrom, and dehumidifying agent, deprived of water vapor, is then brought into contact with the gas. Since the water vapor produced in the boiler, in reactivating the dehumidifying agent, is in the form of steam and represents useful energy, I utilize such steam as the source of supply of heat for a heat operated refrigeration system, so that cooling of the dehumidified gas may also be effected.

It is an object of the invention, therefore, to provide an improvement whereby water vapor that is removed from a gas by a dehumidifying agent or absorbent and thereafter expelled in the form of steam in a boiler to reconcentrate the dehumidifying agent or absorbent, is utilized as a heating medium for a heat operated refrigeration system to effect cooling.

Another object of the invention is to provide a system for treating gases, such as air, in which dehumidifying and cooling of a gas may be independently controlled even though a single source of heat is utilized to effect such dehumidifying and cooling.

The invention, together with the above and other objects and advantages thereof, will be better understood by reference to the following description and accompanying drawing forming a part of this specification, and of which the figure diagrammatically illustrates a combined dehumidifying system and refrigeration system embodying the invention.

Referring to the drawing, the combined dehumidifying system and refrigeration system comprises an absorber 10 and a cooling element 11 connected and arranged in a suitable conduit or duct 12 in which a gas to be dehumidified and cooled is circulated. The gas to be dehumidified and cooled may flow first through the absorber or dehumidifying chamber 10 and then past the cooling element 11, as indicated by the arrows in the duct 12.

The gas introduced into the lower part of absorber 12 comes in contact with a hygroscopic solution discharged from a spray head 14 located in the upper part of absorber 10. The hygroscopic solution employed may be any one of a number of well known dehumidifying agents, such as a solution of calcium chloride, for example, capable of removing water vapor from the gas introduced into the lower part of absorber 12 for upward flow therethrough. The dehumidified gas passes from the upper part of absorber 10 over the surfaces of cooling element 11, whereby the gas is cooled by heat transfer to the refrigerant flowing through the cooling element.

The absorber 10 forms a part of a dehumidifying system in which the dehumidifying agent is withdrawn from absorber 10 through a conduit 15, and reactivated or reconcentrated dehumidifying agent is supplied through a conduit 16 to spray head 14. The reactivating circuit includes a boiler 17 into which dehumidifying agent flows from the bottom of absorber 10 through conduit 15, an outer passage of a liquid heat exchanger 18, and a conduit 19. The boiler 17 is adapted to be heated in any suitable manner, as by a gas burner 20, to expel water vapor from the dehumidifying agent. A pump 21 connected by a conduit 22 to boiler 17 raises the reactivated dehumidifying agent to the absorber 10 through an inner passage of liquid heat exchanger 18 and conduit 16. A cooling jacket 23 is provided about conduit 16 for cooling reconcentrated dehumidifying agent flowing from boiler 17 to absorber 10. A suitable cooling medium, such as water, may be circulated through the jacket 23.

In accordance with my invention, the steam produced in boiler 17 in reactivating the dehumidifying agent is utilized as a source of supply of heat for a heat operated refrigeration system of which the cooling element 11 forms a part. The refrigeration system may be of an absorption type like that described in United States Letters Patent No. 2,282,503 of A. R. Thomas and P. P. Anderson, Jr., granted May 12, 1942. Such a refrigeration system comprises the cooling element or evaporator 11 in which a refrigerant fluid, such as water, evaporates in a partial vacuum. The vaporized refrigerant passes into an absorber in which the refrigerant vapor is absorbed by a suitable liquid absorbent, such as a solution of lithium chloride. The absorption liquid is conducted from the absorber to a generator 24.

By heating the generator 24 refrigerant is expelled from the absorption liquid, condensed in a suitable condenser 25, and then returned to the cooling element 11 to complete the refrigerating cycle. The absorption liquid deprived of refrigerant is conducted from generator 24 to the absorber to absorb refrigerant vapor. The absorber and other parts of the refrigeration system may be arranged within and supported upon a shell or framework 26. In order to simplify the drawing, the absorber and other parts have not been shown, their illustration not being necessary for an understanding of my invention. If desired, reference may be had to the above-mentioned patent of Thomas and Anderson for a detailed description of the refrigeration system, the disclosure of which may be considered as being incorporated in this application.

The generator 24 may include a plurality of vertical riser tubes in which the absorption liquid is heated. The riser tubes, which may also be referred to as generator or boiler tubes, are disposed within a chamber formed by the outer shell of generator 24. Steam is introduced into the lower part of generator 24 through a conduit 27 which is connected at its lower end to boiler 17. The steam rises in the chamber formed by the outer shell of generator 24, so that full length heating of the vertical riser or boiler tubes is effected.

A vent 28 may be provided in the upper end of generator 24 through which excess steam is discharged from the generator into the atmosphere. The condensate formed in generator 24 drains therefrom through a conduit 29 into a vessel 30 having an overflow conduit 31. From vessel 30 condensate passes through a conduit 32 into a float chamber 33 which is connected by a conduit 34 to the bottom part of boiler 17.

As long as the liquid remains at or above a predetermined level in boiler 17, a float-operated valve 35 at the lower end of conduit 32 is closed, so that liquid will not flow from vessel 30 to chamber 33. When the liquid level falls sufficiently in boiler 17 and chamber 33, however, additional make-up water is supplied to the boiler from vessel 30 due to opening of the float-operated valve 35. The overflow conduit 31 is provided for vessel 30 to allow excess water removed from the dehumidifying agent to boiler 17 to flow to waste.

It will now be understood that a combined heat operated refrigeration system and dehumidifying system has been provided in which the water vapor removed or expelled in the form of steam from the dehumidifying agent in reconcentrating the latter is effectively utilized to operate the refrigeration system, so that both cooling and dehumidifying can be effected with a single heat source or a single boiler system. Moreover, the dehumidifying and cooling of air in duct 12 may be independently controlled, even though only a single source of heat is employed in the system, by either independently controlling the rate at which steam is supplied from boiler 17 to the heat receiving part or generator 24, or the rate at which absorbent is supplied from boiler 17 to the absorber 10.

Although I have shown and described a particular embodiment of my invention, it will be apparent to those skilled in the art that modifications may be made without departing from the spirit and scope of the invention, as pointed out in the following claims.

What is claimed is:

1. In an air conditioning system comprising a duct through which air is circulated, means for dehumidifying air flowing in the duct including a circuit containing a liquid absorbent for absorbing water vapor, means to circulate the absorbent in said circuit, said circuit including one part associated with said duct in which the absorbent absorbs water vapor from the air and a boiler in which water vapor is expelled from the absorbent in the form of steam, refrigeration apparatus including a cooling element arranged to effect cooling of air in the duct, and a heat receiving part, said heat receiving part being connected to receive steam from said boiler.

2. In an air conditioning system including an absorber for dehumidifying air and a cooling element for cooling the air, the combination of a dehumidifying circuit containing an absorbent for water vapor, a pump for circulating the absorbent in the circuit, said circuit including said absorbent and a boiler, a source of heat for said boiler, a refrigeration system including said cooling element and a heat receiving part, and a conduit connecting said boiler and said heat receiving part.

3. Apparatus for treating gases, such as air, including an absorber for absorbing water vapor from a gas and a cooling element to effect cooling of the gas, a boiler, connections for circulating an absorbent for water vapor through and between said absorber and said boiler, a heater for said boiler to expel water vapor from the absorbent in the form of steam for reactivating the absorbent, and structure capable of utilizing the steam produced by said boiler to render said cooling element operable to effect cooling of the gas.

4. A method of cooling and dehumidifying air which includes the steps of utilizing an absorbent for water vapor to absorb water vapor from the air, reactivating the absorbent by driving water vapor therefrom in the form of steam, and employing the steam driven from the absorbent as a heating medium for a heat operated refrigeration system to effect cooling of the air.

5. A method of treating gases, such as air, which comprises circulating an absorbent for water vapor in a circuit in one part of which the absorbent absorbs water vapor from the gas and in another part of which the absorbent is heated to expel water vapor therefrom in the form of steam for reconcentrating the absorbent, the improvement which consists in utilizing the steam produced in reconcentrating the absorbent as a source of supply of heat for a heat operated refrigeration system to effect cooling.

6. The method of treating air in an air conditioning system having a duct and a heat operated refrigeration system for cooling air passing through the duct which comprises circulating an absorbent for water vapor in the duct to absorb water vapor from the air, heating the absorbent to expel the water vapor from the absorbent as steam to reactivate the absorbent, utilizing the expelled steam as a heating medium for the heat operated refrigeration system to effect cooling of the air in the duct, and mixing a portion of the condensed water vapor from the refrigeration system with the absorbent to be heated to maintain a predetermined dilution of the absorbent to insure an adequate supply of steam.

ROBERT S. TAYLOR.